United States Patent [19]

Fukuda et al.

[11] Patent Number: 4,614,874

[45] Date of Patent: Sep. 30, 1986

[54] ORIGINAL DOCUMENT SIZE DETECTING ARRANGEMENT

[75] Inventors: Hiroaki Fukuda, Nara; Kenji Sumiyoshi, Kyoto; Ryoichi Masaki, Tenri; Zempei Tani, Tondabayashi, all of Japan

[73] Assignee: Sharp Kabushiki Kaisha, Osaka, Japan

[21] Appl. No.: 571,187

[22] Filed: Jan. 16, 1984

[30] Foreign Application Priority Data

| | | | |
|---|---|---|---|
| Jan. 21, 1983 | [JP] | Japan | 58-7765[U] |
| Jul. 19, 1983 | [JP] | Japan | 58-132104 |
| Jul. 19, 1983 | [JP] | Japan | 58-132105 |

[51] Int. Cl.[4] ............ G01N 21/86

[52] U.S. Cl. ............ 250/560; 355/75

[58] Field of Search ............ 250/560, 561, 578, 221, 250/222; 355/75, 8; 356/383, 384, 386, 387

[56] References Cited

U.S. PATENT DOCUMENTS

| | | | |
|---|---|---|---|
| 3,689,143 | 9/1972 | Case et al. | 355/8 |
| 3,891,857 | 6/1975 | Wiklund | 250/560 |
| 4,302,098 | 11/1981 | Kan et al. | 355/55 |
| 4,338,020 | 7/1982 | Yukawa | 355/8 |
| 4,417,824 | 11/1983 | Paterson et al. | 250/221 |

*Primary Examiner*—David C. Nelms
*Assistant Examiner*—James G. Gatto
*Attorney, Agent, or Firm*—Birch, Stewart, Kolasch and Birch

[57] ABSTRACT

An arrangement for detecting sizes of original documents for use in a copying apparatus or the like, which is capable of effecting size detection at high reliability irrespective of thicknesses of original documents, and in which an adverse effect due to cross-talk light by neighboring light emitting elements employed in it is eliminated for detection of various sizes based on presence of correct original documents.

5 Claims, 11 Drawing Figures

ORIGINAL DOCUMENT SIZE DETECTING ARRANGEMENT

BACKGROUND OF THE INVENTION

The present invention generally relates to a size detecting arrangement and more particularly, to an arrangement for optically detecting sizes of original documents, for example, in a copying apparatus and the like.

Recently, in the field of copying apparatuses, rapid progress has been made for the an automatic detection of original document sizes, with various systems being proposed therefor described below, (i) A light emitting device and a light receiving device are respectively provided at the sides of an original document cover and a copying apparatus main body under an original document platform or vice versa so as to confront each other, and the sizes of the original documents are detected based upon the magnitude information of the output obtained at the light receiving device.

(ii) Sizes of original documents are detected based on the state of conduction between an electrically conductive rubber material provided on the original document cover and a transparent electrode provided at the main body of the copying apparatus.

(iii) A light emitting device for projecting light from the main body of the copying apparatus towards an original document on an original document platform and a light receiving device for receiving light reflected from the original document are provided for the detection of the original document sizes based upon the magnitude information of the output of the light receiving device.

(iv) A light emitting device for projecting light from the copying apparatus main body towards the original document cover in response to a function for turning the original document cover to a closed position, and a light receiving device for receiving light returning from a light returning reflecting member disposed on the original document cover, are provided for detecting the original document sizes based on the magnitude information of the output of the light receiving device.

In the system of the above item (i), there are disadvantages in problems arise due to invluence from the turning of the original document cover towards the open or closed position, since either one of the light emitting device or the light receiving device is provided at the side of the original document cover and the light receiving element which directly receives light from an exposure lamp for illuminating the original document is liable to be deteriorated.

The system in the above item (ii) is also inconvenient in that the detection of the size of the original document can not be effected with respect to an original document of a book-type, through which an electrical conduction can not be established.

In the system of item (iii), it becomes difficult to detect sizes with respect to original documents that have poor reflecting efficiency.

Meanwhile, in the system of item (iv), since the light emitting device and the light receiving device are disposed at generally the same position, with the reflected light being received by returning via an optical path through which the emitted light has passed, there is a possibility that the output of the light receiving device gives information different from the actual document size due to the irregular reflecting reflection of light from the original document, thus resulting in malfunctions of the size detecting arrangement.

SUMMARY OF THE INVENTION

Accordingly, an essential object of the present invention is to provide a size detecting arrangement for original documents, which is capable of effecting size detection at high reliability irrespective of thicknesses of original documents, with substantial elimination of disadvantages inherent in the conventional arrangements of this kind.

Another important object of the present invention is to provide a size detecting arrangement for original documents as described above, in which an adverse effect due to cross-talk light by neighboring light emitting elements employed therein is eliminated.

In accomplishing these and other objects, according to one preferred embodiment of the present invention, there is provided an arrangement for detecting sizes of original documents, which includes a transparent plate for placing an original document to be copied thereon, an original document cover pivotally connected to the transparent plate for selective or uncovering transparent plate, a reflecting face provided on a surface of the original document cover confronting said transparent plate, a plurality of light emitting elements arranged to respectively emit light from a plurality of spots under said transparent plate in correspondence to detected sizes of original documents, and disposed in such positions as to cause light reflected by the reflecting face in the course of closing of said original document cover, to be incident upon corresponding light receiving elements, and a judging circuit for detecting original document sizes based on signals from said light receiving elements.

By the arrangement according to the present invention as described above, an improved original document size detecting arrangement has been advantageously presented.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
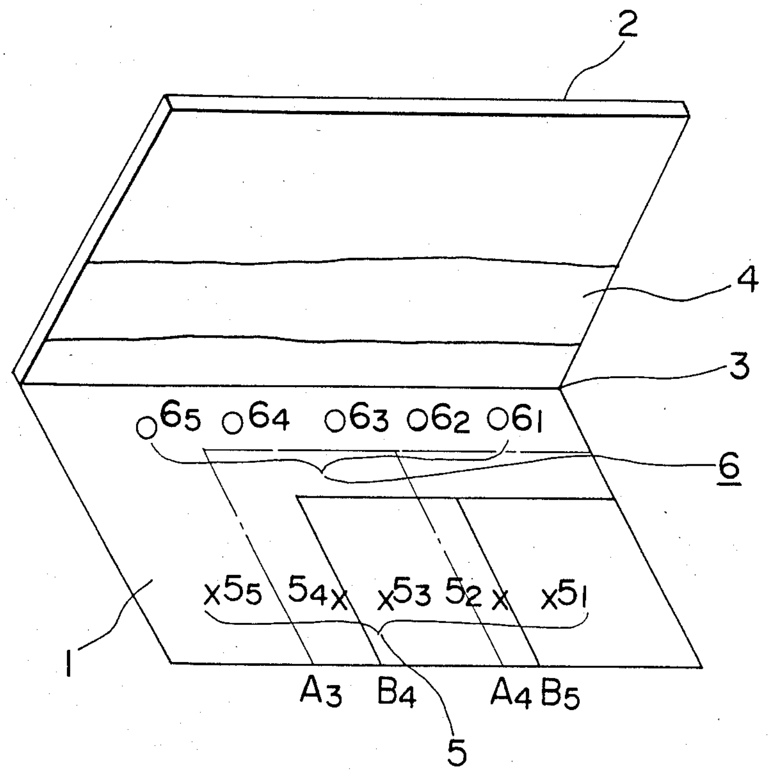
FIG. 1 is a schematic perspective view of an original document platform for use, for example, in a copying apparatus according to one preferred embodiment of the present invention.

Before the description of the present invention proceeds, it is to be noted that like parts are designated by like reference numerals throughout the accompanying drawings.

Referring now to the drawings, there is shown in FIG. 1 an original document platform for placing an original document to be copied thereon in a copying apparatus, to which an original document size detecting arrangement according to the present invention may be applied. The original document platform of FIG. 1 includes a transparent plate 1 for placing an original document to be copied thereon arranged to have a size at least equivalent to the maximum original document size that can be copied and an original document cover 2 pivotally connected to an axis or one side edge 3 of the transparent plate 1 for selective covering and uncovering the surface of said transparent plate 1. On the transparent plate 1, positions for placing original documents of sizes A and B are indicated through utilization of indicating means such as a peripheral edge frame thereof or the like which does not obstruct copying of the original documents. For the actual copying operation, a required original document is set on the transparent plate 1 according to the indication by the indicating means. On the surface of the original document cover 2 at its side confronting the transparent plate 1, an area onto which at least light from light emitting elements 5 to be described later is projected, is formed by a reflecting face 4, for example, a mirror surface member having a high reflection efficiency. In the present embodiment, since the plurality of light emitting elements 5 are arranged in a row, the reflecting face 4 is formed in a belt-like configuration as illustrated. With respect to the above original document platform portion, at the side of a copying apparatus main body, i.e., at the interior of the copying apparatus (not shown) beyond the transparent plate 1, there are provided a plurality of light emitting elements 5 apart from an exposure lamp (not particularly shown) for illuminating the original document during copying, so as to project light onto the original document when such original document is set on the transparent plate 1, and onto the original document cover 2 if the original document is not set on the transparent plate 1. In positions corresponding to those of the above light emitting elements 5, and where emitted light reflected by the reflecting face 4 of the original document cover 2 can reach, and where light reflected from the original document placed on the transparent plate 1 is not incident thereupon, a plurality of light receiving elements 6 are disposed.

The positions for installing the above light emitting elements 5 and the light receiving elements 6 are selected to correspond to respective original documents of A and B sizes, and, for example, four light emitting diodes $\mathbf{5}_1$, $\mathbf{5}_2$, $\mathbf{5}_3$ and $\mathbf{5}_4$ are provided in the positions indicated by marks X in FIG. 1. More specifically, for making it possible to detect original documents of, for example, B5, B4, A4 and A3 sizes, the light emitting element $\mathbf{5}_1$ is disposed within a B5 frame, the light emitting element $\mathbf{5}_2$ is provided out of a B5 frame and within an A4 frame, the light emitting element $\mathbf{5}_3$ is disposed out of the A4 frame and within a B4 frame, and the light emitting diode $\mathbf{5}_4$ is disposed out of the B4 frame and within an A3 frame, respectively. Meanwhile, the light receiving elements $\mathbf{6}_1$, $\mathbf{6}_2$, $\mathbf{6}_3$ and $\mathbf{6}_4$ are provided in positions indicated by marks O in FIG. 1 so as to correspond to the light emitting diodes $\mathbf{5}_1$ to $\mathbf{5}_4$ described above. Moreover, the light emitting element $\mathbf{5}_5$ and the light receiving element $\mathbf{6}_5$ may be further provided outside the A3 frame for monitoring the opening or closing of the original document cover 2.

Figure 2:
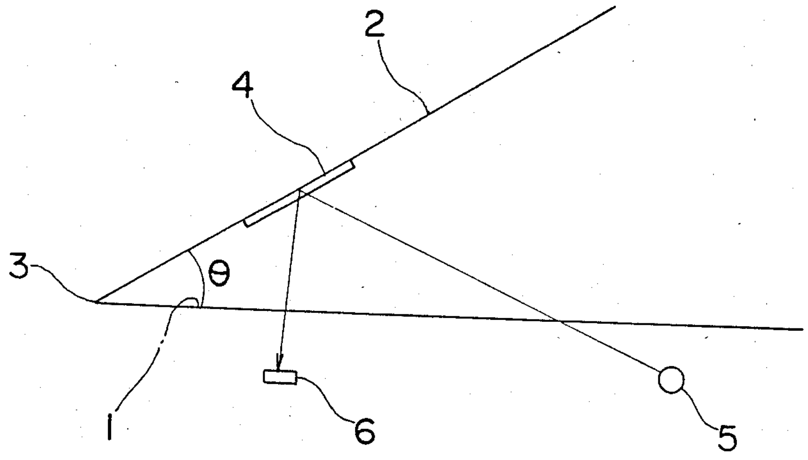
FIG. 2 is a schematic side elevational view of the original document platform of FIG. 1 for explaining an optical path thereof.

It is to be noted here that, with respect to an optical coupling between the light emitting element 5 and the light receiving element 6 through the reflecting face 4 of the original document cover 2, the size of the original document is detected not by light reflected from the original document, but by light reflected from the reflecting face 4 under the state where the original document cover 2 has an angle of $\theta$ ($\theta \neq 0$) with respect to the transparent plate 1 as shown in FIG. 2, i.e. in the course of covering the original document set on the transparent plate 1 with the original document cover 2.

The exact positions of the light emitting elements 5 and the light receiving elements 6 may be determined with reference to an optical path diagram of FIG. 2, but in one specific example, the light emitting elements 5 are disposed in positions at approximately 200 mm from the axis or one side edge 3 of the transparent plate 1 and at about 20 mm from the surface of the transparent plate 1, at an angle of inclination of about 20° with respect to the horizontal plane. In the above arrangement, when the original document cover 2 is moved through a range of $\theta = 20°$ to 30° with respect to the horizontal plane, the light emitted from the light emitting elements 5 and reflected by the reflecting face 4 is collected or converged at position about 135 mm from the elements 5 towards the one side edge 3, and about 15 mm below the transparent plate 1, and at the above light collecting position, the light receiving elements 6 are arranged.

However, the relation in terms of the optical coupling between the light emitting elements 5 and the light receiving elements 6 is not limited to that as described in the above embodiment, but in short, the elements 5 and 6 have only to be arranged in such a relation that, in the course of closing the original document cover 2, the light emitted by the light emitting elements 5 and reflected by the reflecting face 4, is collected onto the light receiving elements 6.

By obtaining the combination of the state of output from the light receiving elements $\mathbf{6}_1$ to $\mathbf{6}_4$ provided at the above respective positions, presence or absence, and sizes of the original documents may be detected.

Figure 3:
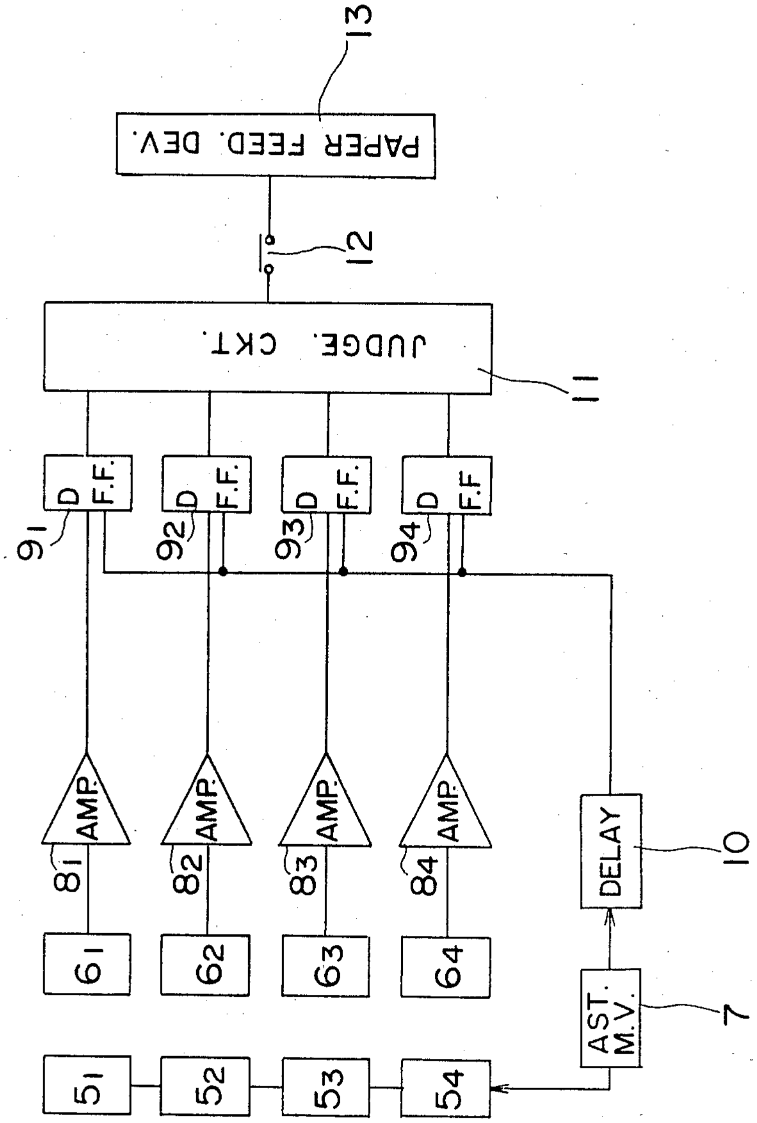
FIG. 3 is an electrical block diagram showing a circuit construction of the arrangement in FIG. 1.

Referring also to FIG. 3, an electrical circuit for detecting sizes of original documents by the outputs of the light receiving elements $\mathbf{6}_1$ to $\mathbf{6}_4$ will be described hereinbelow.

To the respective light emitting elements $\mathbf{5}_1$ to $\mathbf{5}_4$ connected to each other, an astable multi-vibrator 7 is coupled, the output of which is further connected to the one input terminal of each of D flip-flops $\mathbf{9}_1$, $\mathbf{9}_2$, $\mathbf{9}_3$ and $\mathbf{9}_4$ through a delay circuit 10. Meanwhile, the light receiving elements $\mathbf{6}_1$, $\mathbf{6}_2$, $\mathbf{6}_3$ and $\mathbf{6}_4$ are respectively connected to the other input terminals of the D flip-flops $\mathbf{9}_1$ to $\mathbf{9}_4$ through amplifiers $\mathbf{8}_1$, $\mathbf{8}_2$, $\mathbf{8}_3$ and $\mathbf{8}_4$.Outputs of the D flip-flops $\mathbf{9}_1$ to $\mathbf{9}_4$ are connected to a judging circuit 11, which is further coupled with a paper feeding device 13 through a copying function start switch 12.

For distinguishing external light frequencies, the respective light emitting elements $5_1$ to $5_4$ are subjected to pulse light emission by the astable multi-vibrator 7. On the other hand, the light receiving elements $6_1$ to $6_4$ output signals of "H" level in the pulse form upon receipt of the pulse light reflected by the reflecting material 4, and signals of "L" level in the state where the pulse light is not received thereby. The signals thus produced from the light receiving elements $6_1$ to $6_4$ are each applied to the input terminals of the D flip-flops $9_1$ $9_4$ through the amplifiers $8_1$ to $8_4$, and, based on the timing with respect to the clock input applied thereto from the astable multi-vibrator 7 through the delay circuit 10, each of the flip-flops $9_1$ to $9_4$ continues to produce "L" level signal in the presence of an original document on the transparent plate 1, and "H" level signal in the absence of the original document on the transparent plate 1. The output signals of the flip-flops $9_1$ to $9_4$ are further applied to the judging circuit 11, in which the combination of the respective outputs is judged for detection of the size of the original document. The original document size detection signal is applied to the paper feeding device 13 through the copying function start switch 12 in such a manner that upon turning on of the switch 12, the detection signal is simultaneously applied to the paper feeding device 13 so as to automatically select the paper sheet of an optimum size for feeding to the copying apparatus main body (not shown).

Table 1 below shows the relation between original document sizes and the output signals from the light receiving elements $6_1$ to $6_4$, with marks O representing the state where the light receiving elements $6_1$ to $6_4$ are receiving light, and marks X denoting the state where said elements $6_1$ to $6_4$ are not receiving light.

| Original document size | | No original document | B5 | A4 | B4 | A3 |
|---|---|---|---|---|---|---|
| Light receiving state of light receiving elements | $6_1$ | O | X | X | X | X |
| | $6_2$ | O | O | X | X | X |
| | $6_3$ | O | O | O | X | X |
| | $6_4$ | O | O | O | O | X |

For preventing malfunctions of the light receiving elements 6 by external light, it may be so arranged that, by adopting infrared rays as the light source for the light emitting elements 5, photo-diodes and the like having peak sensitivity with respect to the infrared ray wavelengths are employed for the light receiving elements 6, with visible light cutting filters being further provided at the light receiving portion. Meanwhile, by subjecting the light emitting elements 5 to the pulse driving, malfunctions thereof can be prevented through distinguishment from the general commercial power supply frequencies.

As is seen from the foregoing description, according to the present invention, since the sizes of original documents are detected in the course of closing the original document cover, i.e. in the state where the original document cover is inclined, detection may be effected without any inconvenience, even with respect to original documents having different thicknesses for utilization of the original document detecting function over a wide range. Moreover, owing to the arrangement that original document sizes are detected through combination of presence or absence of reflected light from the reflecting surface having the high reflecting efficiency, positive detection can be made for original documents of light, and thus, detecting function may be effected at high accuracy.

Incidentally, in the original document size detecting arrangement as described so far, if the plurality of light emitting elements $5_1$ to $5_5$ are simultaneously illuminated, not only light from the particular light emitting element 5 confronting the corresponding one of the light receiving elements $6_1$ to $6_5$ at a relation of 1:1, but so-called cross-talk light from other light emitting elements is also incident upon the light receiving elements $6_1$ to $6_5$. When an input light signal in the absence of the original document is represented by S, and that in the presence of the original document is denoted by N, there has been such an inconvenience that the signal ratio S/N is deteriorated due to the cross-talk light, thus making it impossible to effect proper judgements.

Figure 4:
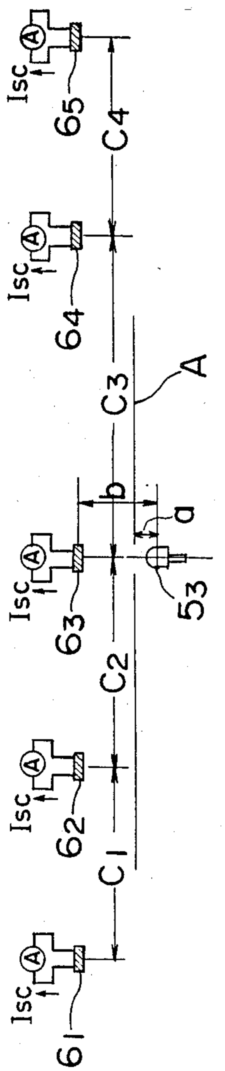
FIG. 4 is a schematic diagram showing a general construction of an experimental arrangement for measuring cross-talk light.

More specifically, referring further to a diagram of FIG. 4, there is schematically shown a general construction of an experimental device for measuring the cross-talk light as referred to above. In the device of FIG. 4, one light emitting element $5_3$ is provided at the central portion, and in the similar manner as in FIG. 1, a suitable light shielding plate A having a slit is disposed at a distance a=20 mm from the light emitting element $5_3$, while five light receiving elements $6_1$ to $6_5$ are arranged with respect to the central element $6_3$ provided at a distance of b=250 mm from said light emitting element $5_3$. Distances between the respective light receiving elements are set as $C_1$=44 mm, $C_2$=48 mm, $C_3$=75 mm and $C_4$=45 mm so as to correspond to the original document sizes. In other words, the light emitting element $5_3$ and the light receiving elements $6_1$ to $6_5$ in the experimental device of FIG. 4 are so disposed as to be substantially in the same relation as in the arrangement of FIG. 1. Results of the experiment are shown in a graph of FIG. 5, in which distances from the central light receiving element $6_3$ to the other light receiving elements are taken in the abscissa, while photo-output currents Isc of the respective light receiving elements are plotted in the ordinate. In the S/N ratios simultaneously given in the graph, N is due to the cross-talk light.

Figure 5:
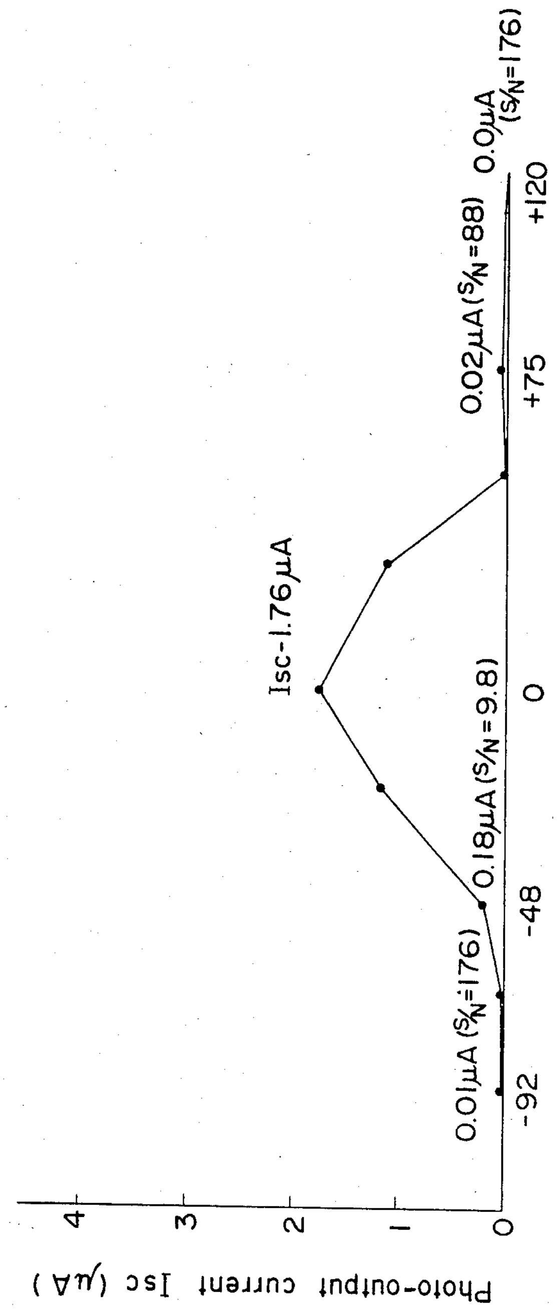
FIG. 5 is a graph showing results of experiments by the arrangement of FIG. 4.

As is seen from FIGS. 4 and 5, the S/N ratio as affected by the neighboring light emitting element is 9.8, and the S/N ratio as influenced by the light emitting element located at every other position becomes 176. In the experiment, although N is the measured light output incident upon the light receiving element as the cross-talk light from the light emitting elements other than the confronting one thereof as described previously, input light due to scattering in the presence of the original document is further added to the actual value of N, and thus, the light emitting intensity of the light emitting element itself is dispersed in the range of 500%. When such dispersion is taken into consideration, the S/N as affected by the neighboring light emitting element becomes 1.96, and that as affected by the light emitting element located at every other position becomes 35.2.

From the above fact, it is seen that, although the influence by the light emitting element located at least at every other position may be ignored, the effect of the cross-talk light by the neighboring light emitting element can not be neglected, resulting in a state incapable of detecting presence or absence of the original document.

Figure 6:
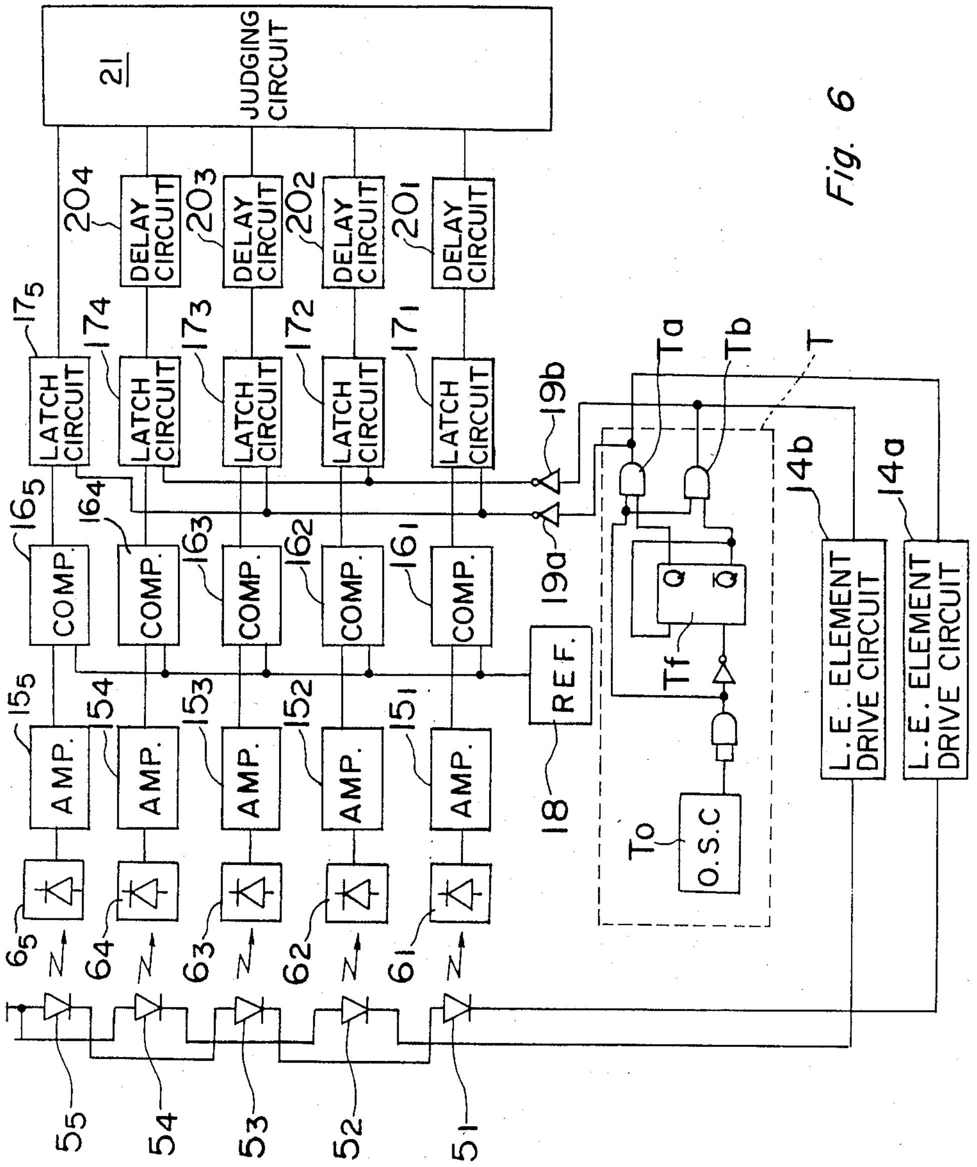
FIG. 6 is an electrical block diagram similar to FIG. 3, which particularly shows another embodiment thereof.

Referring further to FIG. 6, there is shown an electrical block diagram for an original document size detecting arrangement according to another embodiment of the present invention particularly intended to detect various original document sizes based on correct judgement for presence or absence of the original document through elimination of an adverse effect by the cross talk light as described so far.

The circuit arrangement of FIG. 6 is provided with a timing generation circuit T (surrounded by dotted lines) which includes an oscillator To coupled with a D flip-flop Tf, etc. and produces timing signals Ta and Tb deviated in phase by 180°. The timing signals Ta and Tb are applied to light emitting element drive circuits 14*a* and 14*b* coupled with the circuit T for alternate driving of the light emitting elements $\mathbf{5}_1$, $\mathbf{5}_3$ and $\mathbf{5}_5$, and $\mathbf{5}_2$ and $\mathbf{5}_4$ connected in series with each other.

Figure 7:
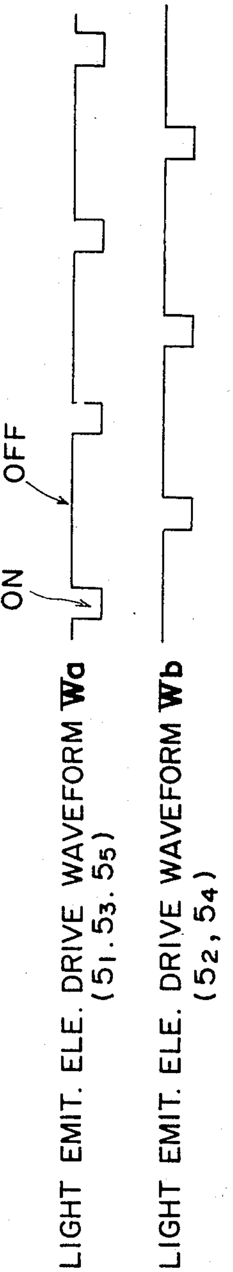
FIG. 7 is a time-chart showing waveforms of signals at main portions in the circuit arrangement of FIG. 6.

The drive waveforms Wa and Wb for the above light emitting elements $\mathbf{5}_1$, $\mathbf{5}_3$ and $\mathbf{5}_5$, and $\mathbf{5}_2$ and $\mathbf{5}_4$, are as shown in the time-charts of FIG. 7, and the neighboring light emitting elements are not simultaneously illuminated, with the neighboring light emitting elements $\mathbf{5}_2$ and $\mathbf{5}_4$ being turned off (or turned on) when the light emitting elements $\mathbf{5}_1$, $\mathbf{5}_3$ and $\mathbf{5}_5$ are turned on (or turned off) so as to effect light emission by pulse driving at the so-called $\frac{1}{2}$ time division.

Meanwhile, to the light receiving elements $\mathbf{6}_1$ to $\mathbf{6}_5$, there are respectively coupled amplifier circuits $\mathbf{15}_1$, $\mathbf{15}_2$, $\mathbf{15}_3$, $\mathbf{15}_4$ and $\mathbf{15}_5$, comparison circuits $\mathbf{16}_1$, $\mathbf{16}_2$, $\mathbf{16}_3$, $\mathbf{16}_4$ and $\mathbf{16}_5$, and latch circuits $\mathbf{17}_1$, $\mathbf{17}_2$, $\mathbf{17}_3$, $\mathbf{17}_4$ and $\mathbf{17}_5$respectively, so that photo-output currents of the respective light receiving elements 6 are amplified by the amplifier circuits 15 for comparison, at the comparison circuits 16, with a reference value supplied from a reference circuit 18 connected to said comparison circuits 16, and the results of comparison are taken into the latch circuits 17 according to the timing signals Ta and Tb of the timing generation circuit 11. The latch circuits $\mathbf{17}_1$, $\mathbf{17}_3$ and $\mathbf{17}_5$ take in the results of comparison at a negative edge of a signal obtained by inverting the timing signal Ta through an inverter 19*a*, while the latch circuits $\mathbf{17}_2$ and $\mathbf{17}_4$ take in the results of comparison at a negative edge of a signal obtained by inverting the timing signal Tb through an inverter 19*b*, with the inverters 19*a* and 19*b* being inserted between the circuits 11 and 17. In other words, the latch circuits 17 take in the comparative results of light receiving output following the light emission through a predetermined delay time from the time point of light emission by the light emitting elements 5.

Delay circuits $\mathbf{20}_1$, $\mathbf{20}_2$, $\mathbf{20}_3$ and $\mathbf{20}_4$ inserted between the latch circuits $\mathbf{17}_1$, $\mathbf{17}_2$, $\mathbf{17}_3$ and $\mathbf{17}_4$, and a judging circuit 21 are intended to retain the outputs of the latch circuits $\mathbf{17}_1$ to $\mathbf{17}_4$ during monitoring of the opening or closing of the original document cover 2 by the output of the latch circuit $\mathbf{17}_5$. Meanwhile, the judging circuit 21 ensures that the original document cover 2 has been closed, and judges the original document size based on the state of outputs of the delay circuits $\mathbf{20}_1$ to $\mathbf{20}_4$.

By the above embodiment, the S/N ratio affected by the cross-talk light of the other light emitting elements is limited to that influenced by the cross-talk light of the light emitting elements located at every other position, and in the previous specific example, the S/N is 35.2 even in the worst case, and any adverse effect thereby is negligible. In other words, by the above arrangement, the value for S/N may be increased, and the sensitivity for judging presence or absence of original documents may be raised to 18 times.

Figure 8:
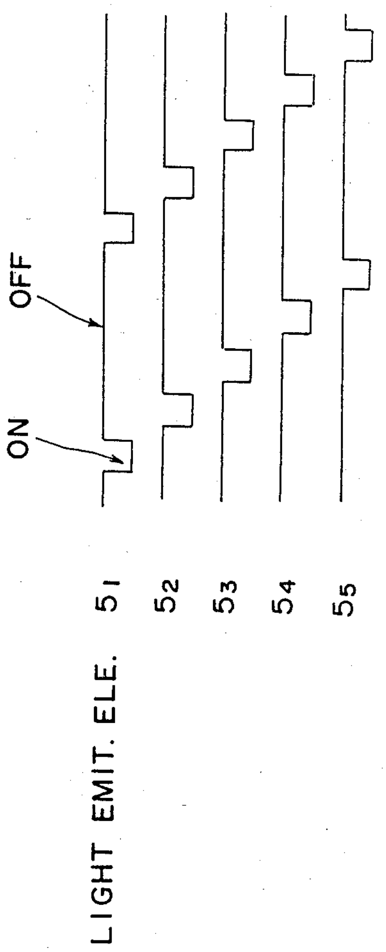
FIG. 8 is a time-chart similar to FIG. 7, which is particularly related to a further embodiment thereof.

In the above embodiment, although the pulse driving rs effected through $\frac{1}{2}$ time division, the number of time divisions is not limited to $\frac{1}{2}$, but may be changed to $\frac{1}{3}$, $\frac{1}{4}$ or 1/5 time division, depending on the requirements of the original document size detecting arrangement. Moreover, in the present embodiment, by deviating the light emitting timings of all of the light emitting elements, for example, through 1/5 time division as shown in the time-chart of FIG. 8, it is possible to provide a circuit construction in which the S/N due to the cross-talk light becomes infinity for complete elimination of its influence.

As is seen from the foregoing description, in the above embodiment of FIG. 6, it is so arranged that, in the original document size detecting arrangement which has the reflecting face associated with the original document cover in the optical path between the plurality of light emitting elements and corresponding light receiving elements, and in which said optical path has a comparatively long distance, the light emitting elements are subjected to pulse driving through time division so as to avoid simultaneous light emission by at least neighboring ones of said light emitting elements, with outputs of said light receiving elements being arranged to be detected according to said time division, whereby the adverse effect of cross-talk light from the light emitting elements other than those corresponding to the light receiving elements is eliminated for correct detection of original document sizes.

Referring further to optical path diagrams of FIGS. 9 to 11, proper positioning of the light emitting elements 5 and the light receiving elements 6 will be described hereinbelow.

Figure 9:
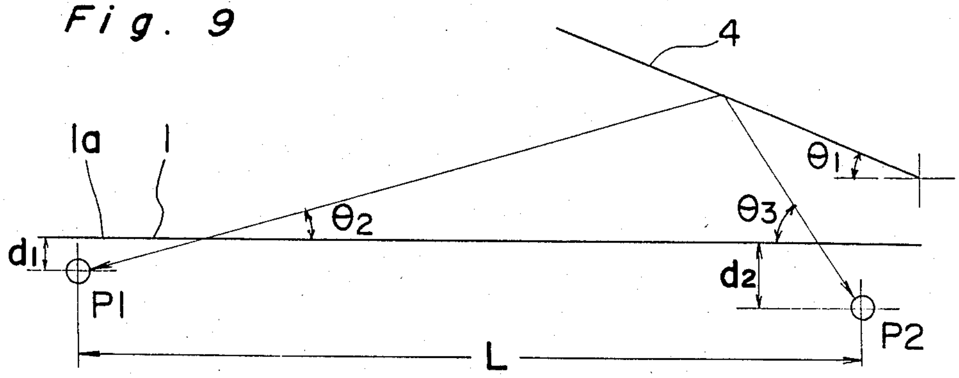
FIGS. 9, 10 and 11 are diagrams explanatory of the state of optical path and arrangements of light emitting elements and light receiving elements.

In FIG. 9, a symbol P1 represents a point located at a distance d1 of about 15 mm below the original document placing surface 1*a* of the transparent plate 1, while a symbol P2 denotes a point located at a distance d2 of about 30 mm below the surface 1*a* of the transparent plate 1, with the points P1 and P2 being spaced from each other a distance L of about 215 mm in a horizontal direction. On the assumption that the reflecting face 4 is inclined at an angle $\theta = 15°$, angles formed by light for photo-coupling the points P1 and P2, with respect to the original document placing surface 1*a* of the transparent plate 1 may be represented by $\theta = 15°$ at the side of the point P1 and $\theta 3 = 57°$ at the side of the point P2.

Figure 10:
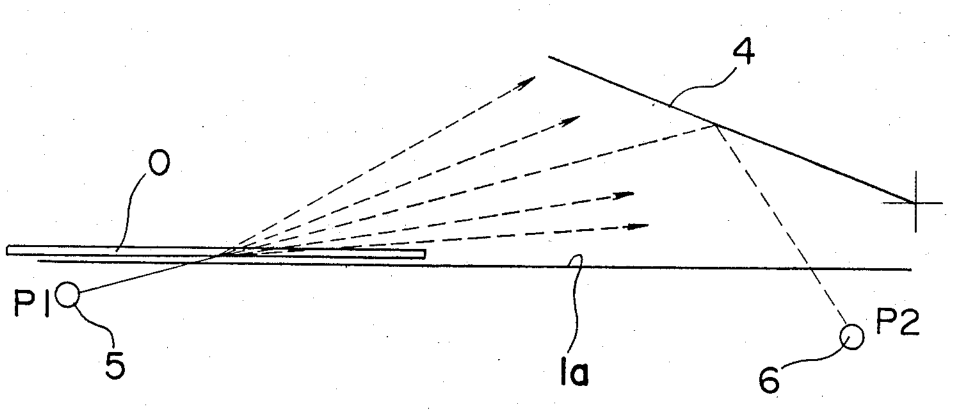

FIG. 10 shows the state in which the light emitting elements 5 are disposed at the position of P1, and the light receiving elements 6 are provided at the position of P2 (The same arrangement as in FIGS. 1 and 2). In FIG. 10, when an original document O is placed on the surface 1*a* of the transparent plate 1, light projected from the light emitting elements 5 is scattered by the original document O for diffusion as shown by dotted lines, and thus, only limited light is incident upon the light receiving elements 6 at the point P2. In other words, the photo-output current of the light receiving elements 6 in the presence of the original document O is extremely reduced as compared with that in the absence of the original document, with the consequent increase of S/N ratio, which is the ratio of photo-output current in the presence of the original document to that in the absence thereof.

Figure 11:
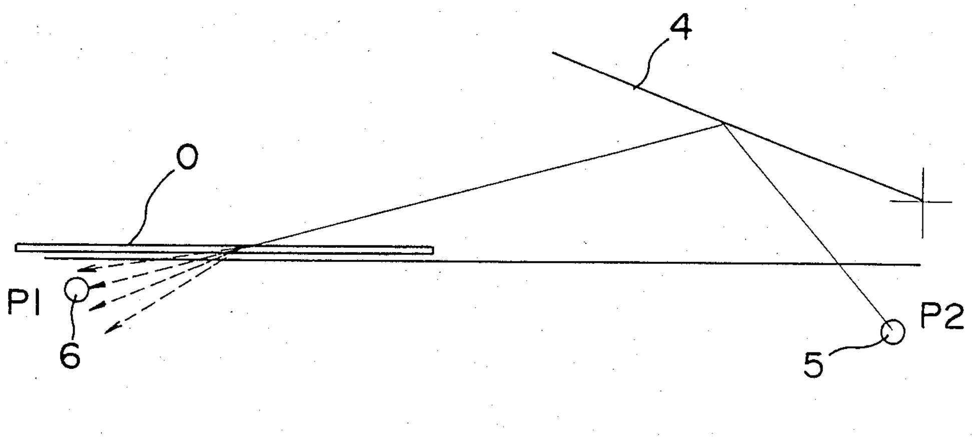

On the contrary, under the state of FIG. 11 in which the light emitting elements 5 are disposed at the point P2 and the light receiving elements 6 are provided at the point P1 in the optical path diagram of FIG. 9, in the case where the original document O is placed on the surface 1*a* of the transparent platform 1, although light projected from the light emitting elements 5 (light reflected by the reflecting face 4) is scattered at the original document O as shown by the dotted lines, the diffusion thereof is smaller than that in FIG. 10, with more light being incident upon the light receiving elements 6. In other words, the photo-output current of the light receiving elements 6 in the presence of the original document O is comparatively larger than that in the absence of the original document, while the S/N ratio becomes smaller.

For a specific example, in the arrangements of FIGS. 10 and 11, when paper exclusive for copying is employed for an original document, with driving current for the light emitting elements 5 being set at DC 80 mA, the S/N ratio for the arrangement of FIG. 10 becomes 300, while that of the arrangement of FIG. 11 becomes 10, and thus, it is quite clear that the arrangement of the former in which the light emitting elements 5 are disposed at the original document placing side (i.e. at the side of the point P1 in the optical path diagram of FIG. 9), is advantageous for the detection of the original document size.

Meanwhile, it has been ensured both theoretically and experimentally that the S/N ratio can be more improved in the case where the scattering of light takes place at a point closer to the light emitting elements 5 than a point half way in the total optical path length between the light emitting elements 5 and the light receiving elements 6, and in the arrangement having the original document cover 2 pivotally connected to the one side edge 3 of the transparent plate 1 so as to utilize the forward side of the original document cover for placing the original document, the relation of less than $\frac{1}{2}$ of the total optical path length may be readily achieved by arranging the light emitting elements 5 at the original document placing side as described above.

As is seen from the foregoing description, by providing the light receiving elements at the side of the original document placing portion, an original document size detecting arrangement superior in S/N ratio in addition to the favorable effects as described so far may be advantageously presented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A system for detecting the size of an original document in a copying maching comprising:

transparent means for supporting on a top surface thereof an original document for copying, said transparent means having a specified region upon which said original document must be placed in order to carry out a copying operation;

original cover means, pivotally disposed relative to said transparent means, for selectively covering and uncovering said top surface of said transparent means;

a plurality of discrete light emitting means, linearly arranged beneath a bottom surface of said transparent means and placed below said specified region upon which said original document must be placed in order to carry out a copying operation, for providing light pulse emmissions;

reflecting means, mounted to said original cover means and confronting said transparent means, for reflecting those light pulse emissions of said plurality of light emitting means whose optical paths are not blocked by an original document supported by said transparent means, said original cover means being positioned at an angle with respect to said transparent means greater than zero degrees at the time when said light emitting means provide said light pulse emissions;

a plurality of light receiving means linearly arranged beneath the bottom surface of said transparent means for receiving said reflected light pulse emissions and each producing a detection output, wherein each of said light receiving means being associated with a respective discrete light emitting means, said light receiving means being placed below said transparent means outside said specified region, the line described by said linear arrangement of said plurality of discrete light emitting means being parallel to the line described by said linear arrangement of said plurality of light receiving means; and judging means, responsive to said detection outputs, for determining original document sizes based upon said detection output from said light receiving means.

2. The system for detecting the size of an original document of claim 1, said original cover means pivoting around a pivot point adjacent said transparent means, said light emitting means being provided at a side of a specified region located opposite said specified region from said pivot point, said light receiving means being provided adjacent said pivot point.

3. The system for detecting the size of an original document of claim 1 further comprising:

control meaas for time division driving said light emitting means so that no two adjacent ones of said light emitting elements emit light simultaneously, said judging means determining original document size according to said detection outputs of said light receiving means in accordance with said time division driving of said light emitting means.

4. The system for detecting the size of an original document of claim 1 wherein each of said light emitting means is positioned 200 mm below the bottom surface of said transparent means, at an angle of inclination of 20° with respect to the plane of said transparent means.

5. The system for detecting the size of an original document of claim 1 wherein each said light emitting means comprises an infrared ray emitting light source and each said light receiving means comprises a photo diode having peak sensitively with respect to infrared ray wavelengths.

* * * * *